United States Patent [19]

Jennings et al.

[11] Patent Number: 5,883,166
[45] Date of Patent: Mar. 16, 1999

[54] LIQUID INTERNAL MOLD RELEASE AGENTS FOR UNSATURATED POLYESTER THERMOSETTING MOLDING COMPOUNDS

[76] Inventors: Thomas C. Jennings, 18200 S. Park Blvd., Shaker Hts., Ohio 44120; Joseph Drasner, 15 Saratoga Ct., Beachwood, Ohio 44122

[21] Appl. No.: 882,904

[22] Filed: Jun. 26, 1997

[51] Int. Cl.$^6$ .................................................. C08K 5/16
[52] U.S. Cl. .................. 524/186; 523/500; 523/513; 523/527; 525/43; 525/539; 525/540; 528/332; 524/81; 524/270; 524/272; 524/394; 524/401; 524/494; 524/538; 524/539
[58] Field of Search .................................... 523/500, 513, 523/527; 525/43, 539, 540; 528/332; 524/81, 186, 270, 272, 394, 401, 494, 538, 539

[56] References Cited

U.S. PATENT DOCUMENTS

| | | |
|---|---|---|
| 4,098,731 | 7/1978 | von Bonin et al. . |
| 4,408,000 | 10/1983 | Lee . |
| 4,409,351 | 10/1983 | Lee . |
| 4,444,921 | 4/1984 | South, Jr. ................................. 523/200 |
| 4,451,610 | 5/1984 | Collister .................................... 525/19 |
| 4,551,507 | 11/1985 | Haylock et al. . |
| 4,555,534 | 11/1985 | Atkins ..................................... 523/507 |
| 4,753,966 | 6/1988 | Haas et al. . |
| 4,777,195 | 10/1988 | Hesse et al. ............................. 523/461 |
| 5,162,401 | 11/1992 | Ross et al. ............................... 523/511 |
| 5,182,034 | 1/1993 | Meyer et al. . |
| 5,256,709 | 10/1993 | Ross et al. ............................... 523/510 |
| 5,354,809 | 10/1994 | Hesse et al. ............................... 525/64 |
| 5,412,003 | 5/1995 | Akiyama et al. . |
| 5,445,877 | 8/1995 | Kawakami et al. . |
| 5,449,549 | 9/1995 | Even et al. . |
| 5,561,192 | 10/1996 | Lee et al. . |
| 5,576,409 | 11/1996 | Mackey . |
| 5,585,439 | 12/1996 | Lee et al. . |
| 5,637,630 | 6/1997 | Atkins ..................................... 523/523 |

OTHER PUBLICATIONS

"Laser Surface Engineering Of Automotive Components," Uddin, M. Nasim; Mohiuddin, Gulam; and Duley, Walter W. Plastic Engineering/Feb. 1997, pp. 35–37.

"Internal Mold Release Agents in FRP Processing, " Waldeck, Jack W., Reinforced Plastics Report, Plastics Design & Processing, Jan, 1975.

"Internal Lubricants For Matched Metal Die Molding Of Reinforced Polyesters, " Synthetic Products Company, Div. Dart Industries, Inc. 1972 no month available.

"Internal Lubricants For Matched Metal Die Molding," Jennings, Thomas C., Anderson, C. Harold; Drasner, Joseph, 27th Annual Technical Conference 1972, Reinforced Plastics/Composites Institute, The Society of the Plastics Industry, Inc. no month available.

"Selecting Mold–Release Agents For FRP," Waldeck Jack W., Plastics World/RP Update, Plastics World, Jan. 19, 1976.

"Parameters Affecting The Selection Of Metallic Soaps For Polyester Molding Systems," Fletcher, Charles W.; Walceck, Jack W., 30th Anniversary Technical Conference, 1975. Reinforced Plastics/Composites Institute, The Society of the Plastics Industry, Inc.

*Primary Examiner*—Samuel A. Acquah
*Attorney, Agent, or Firm*—Watts Hoffmann Fisher & Heinke

[57] ABSTRACT

The present invention is a molding compound comprising an unsaturated polyester resin, a filler, a reinforcement material, a crosslinking monomer, a catalyst, and a mold release agent. The compound also may include a thickener and a low profile thermoplastic additive. The mold release agent is a liquid at room temperature and is selected from the group consisting of tertiary alkyl primary amine carboxylates. The present invention further includes a method of manufacturing a molded plastic component using said molding compound.

10 Claims, No Drawings

5,883,166

LIQUID INTERNAL MOLD RELEASE AGENTS FOR UNSATURATED POLYESTER THERMOSETTING MOLDING COMPOUNDS

FIELD OF THE INVENTION

This invention relates to liquid internal mold release agents for unsaturated polyester thermosetting molding compounds, and a method of manufacturing plastic components using such compounds. The liquid internal mold release agents are selected from the group consisting of tertiary alkyl primary amine carboxylates.

BACKGROUND OF THE INVENTION

There are numerous compounds that are used in the production of plastic components. Often, the components are formed using a molding process. To successfully manufacture a molded plastic part, a mold release agent is used in the manufacturing process to permit releasing the finished component from the mold.

One general class of mold release agent is "external" mold release agents. External mold release agents are applied directly to the mold. This procedure increases the manufacturing time and must be repeated every one to five parts. In addition, the mold release agent builds up on the mold, so the mold must be cleaned periodically with a solvent or washing agent. This is costly and time consuming.

A second general class of mold release agent is "internal" mold release agents. Internal mold release agents are added directly into the molding compound. Since they do not have to be continuously reapplied to the mold, internal mold release agents increase productivity and reduce cost.

There are many examples of compounds containing internal mold release agents for manufacturing various types of plastic components. Lee, U.S. Pat. Nos. 4,408,000 and 4,409,351 disclose the use of a fatty acid in the production of thermoplastic parts, which generally are flexible.

Various mold release agents are used in the production of other flexible elastomers, such as polyurethanes and other foams. Haas et al., U.S. Pat. No. 4,753,966 discloses the use of a zinc salt dissolved in an amine liquid as a mold release agent in the production of polyurethanes. Similarly, Meyer et al., U.S. Pat. No. 5,182,034 discloses the use of a metal salt combined with an amine as a mold release agent in the production of polyurethanes.

Mackey, U.S. Pat. No. 5,576,409 discloses the use of a fatty acid amide as a mold release agent. Haylock et al., U.S. Pat. No. 4,551,507 discloses a molding compound including a linear saturated polyester. The mold release agent is a metallic amine carboxylate formed from a metal-containing salt.

One type of molding compound, not described in any of the above patents, is an unsaturated polyester thermosetting molding compound. Such compounds sometimes are referred to as unsaturated polyester resin systems because they all include an unsaturated polyester resin. These compounds are well known in the art. For example, U.S. Pat. Nos. 5,585,439, 5,561,192, 5,449,549, 5445,877, and 5,412,003 each describe various formulations of unsaturated polyester resin systems, which differ from the present invention as described below. They are used in the production of strong, rigid plastic components used as automotive parts, boat hulls, other transportation products, appliances, furniture, computer components, electrical products— anywhere where it is desirable to have a strong, rigid, intricate plastic part manufactured to a stringent tolerance.

Two main types of unsaturated polyester thermosetting molding compounds are known as bulk molding compounds ("BMC") and sheet molding compounds ("SMC"). Such compounds include an unsaturated polyester resin. These resins, with a catalyst, can be cured in a heated mold to form a clear, hard composition. As it cures, the resin has a tendency to shrink slightly, thereby aiding in the release from the mold. The resultant composition, however, is extremely brittle, and therefore not useful in most applications. Therefore, a reinforcement component is added. A filler component, generally a fine ground mineral, is also added to improve appearance and surface characteristics. One common reinforcement material is chopped fiberglass. The resin, glass, and filler can be mixed directly to form a compound having a dough-like consistency, which is then added to a mold. Such a compound is commonly known as a bulk molding compound or BMC. Alternatively, as is known in the art, the molding compound can be formed into a thin sheet, called a sheet molding compound or SMC. The SMC is then molded. Kawakami et al., U.S. Pat. No. 5,445,877, which is incorporated here by reference, provides an example of the making of a sheet molding compound. Both BMCs and SMCs are particularly useful in manufacturing strong, intricate components to stringent tolerances. As, for example, in some of the systems described in the patents referenced above, other components commonly used in BMCs and SMCs include a low profile thermoplastic additive, a crosslinking monomer, and a thickener. Optionally, a pigment also can be included to produce a colored molded part. The use of such additives in unsaturated polyester thermosetting molding compounds, for both BMC and SMC processes, is well known in the art.

When mixed, the resin penetrates or wets the fiberglass reinforcement, thereby dispersing throughout the molding compound. It is desirable to have as much filler as possible in the BMC or SMC, since filler is far less expensive than resin. The addition of filler (and glass), however, inhibits the shrinking that occurs when the resin is molded by itself. BMCs and SMCs, therefore, require that a mold release agent be added. The more filler added, the harder it is to release the finished component, and the more mold release agent that must be used. Likewise, the more intricate the part, the harder it is to release, and the more mold release agent that must be used as well.

The most common mold release agent used in BMC and SMC processes is zinc stearate. It is estimated that zinc stearate is used as the mold release agent in as much as 90% of BMC and SMC processes. Zinc stearate acts by exuding to the surface of the molding compound, thereby contacting the mold and providing lubrication at the mold surface to permit release.

Zinc stearate is a fine, dusty powder, which creates several difficulties. As a powder, zinc stearate is difficult to disperse in the liquid resin. Thus, lumps can form. When lumps of zinc stearate exude to the mold surface, the result is imperfections or pitting on the surface of the finished product. These imperfections interfere with the subsequent treatment of the surface of the part, including interference with the application of vapor deposited metals, laminants, adhesives, paints and the like commonly applied to the surface of molded plastic parts. Depending on the part and its use, the part must be sanded, specially washed, or otherwise treated before adding surface coatings. For example, Uddin, et al., "Laser Surface Engineering of Automotive Components", *Plastics Engineering* (1997), discloses a method by which SMC automotive parts are treated with a laser to improve surface characteristics. Sometimes, imperfect parts must be discarded. The problems encountered using zinc stearate become more acute as the component becomes more intricate, since more mold release agent must be used.

Powder mold release agents such as zinc stearate also reduce the amount of filler that can be used in that they raise the viscosity of the liquid polyester resins. As a result, powder mold release agents increase the viscosity of the molding compound inhibiting the wetting of the reinforcement by the resin. Thus, more resin and less filler must be used, which increases raw material costs.

To overcome the drawbacks of powder mold release agents like zinc stearate, there has been a need for a liquid mold release agent for use in BMC and SMC processes. State-of-the-art liquid mold release agents are liquid zinc salts and phosphate esters. These materials, however, do not provide sufficient mold release activity for use in the low-shrink resin systems of BMC and SMC processes, and particularly are unsuitable for use in the molding of intricate parts to stringent tolerances. These materials also are very expensive. Thus, for the vast majority of BMC and SMC processes, powder mold release agents such as zinc stearate (and to a lesser extent calcium stearate) remain the primary currently available option.

Two other types of processes for molding with unsaturated polyester thermosetting molding compounds are pultrusion and wet-mat molding processes. In pultrusion, the reinforcement, usually fiberglass, is wheeled off a spool, dipped into a resin mixture, and pulled through a heated die to cure the compound. A mold release agent is used as part of the resin mixture to release the compound from the die. In wet-mat molding, a reinforcement mat is layed on the mold and the molding compound is poured on top of the mat. A mold release agent likewise is used in wet-mat processes. Pultrusion and wet-mat molding compounds differ from BMCs and SMCs partly in that no low profile thermoplastic additive or thickening agent is used. BMCs and SMCs are preferred for more complex molded components, and generally are more difficult to release.

The inventors of the present invention have discovered that certain tertiary alkyl primary amine carboxylates are soluble in and highly compatible with uncured unsaturated polyester resins thereby eliminating many of the disadvantages of zinc stearate and state-of-the-art liquid mold release agents, and are more efficient as mold release agents. The liquid mold release agents of the present invention are particularly advantageous in BMC and SMC processes where release is more difficult to achieve.

SUMMARY OF THE INVENTION

It is therefore an object to the present invention to provide an improved molding compound that is an unsaturated polyester thermosetting molding compound, and a method of manufacturing a molded, plastic component using the same.

It is a further object of the present invention to provide improved internal mold release agents for use in an unsaturated polyester thermosetting molding compound, and particularly for use in BMC and SMC manufacturing processes. It is a further object of the present invention that said mold release agents be liquid at room temperature and provide improved mold release activity, enhanced surface characteristics of the final product to permit the immediate application of various coatings, adhesives, or metals, and permit a higher proportion of filler to be used in the system, thereby increasing productivity, lowering cost, and improving the quality of the final product.

These and other advantages will be apparent upon reading the detailed description below. The present invention is a molding compound, particularly an unsaturated polyester thermosetting molding compound, comprising an unsaturated polyester resin, a crosslinking monomer, a reinforcement material, a filler, and a mold release agent, where the mold release agent is a liquid at room temperature and is selected from the group consisting of tertiary alkyl primary amine carboxylates having the general formula

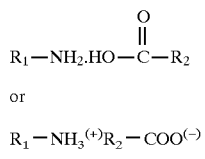

or $R_1-NH_3^{(+)}R_2-COO^{(-)}$ where $R_1$ is a linear or branched tertiary alkyl group in the $C_{12}-C_{22}$ range, and $R_2$ is a linear or branched, saturated or unsaturated, alkyl group in the $C_8-C_{24}$ range. The compounds also include a crosslinking monomer, a low profile thermoplastic additive, a catalyst, and a thickener, as are commonly used in the art.

The compounds of the present invention can be used to manufacture molded plastic components. The unsaturated polyester resin, filler, reinforcement material, crosslinking monomer, liquid mold release agent, and the other additives are all mixed in bulk at room temperature in a manner known to those skilled in the art. Optionally, the molding compound can then be formed into a thin sheet. The bulk or sheet molding compound is then placed into a mold, which is heated at a temperature and for a time sufficient to cure the compound. The product is then released from the mold and cooled. The resultant product is a strong, rigid plastic component having enhanced surface characteristics suitable for immediate treatment with vapor deposited metals, paints, adhesives, laminants, and the like.

DETAILED DESCRIPTION

The molding compounds of the present invention comprise an unsaturated polyester resin, a crosslinking monomer, a filler, a catalyst, a reinforcement material, and a mold release agent. Other components that are used in the compounds include a low profile thermoplastic additive and a thickener.

Unsaturated polyester resins are well known in the art and are formed from the condensation reaction of a diol, such as ethylene glycol, propylene glycol, or dipropylene glycol, with a mixture of an unsaturated crosslinkable dicarboxylic acid or anhydride and a noncrosslinkable dicarboxylic acid or anhydride. Typically, mixtures of malic anhydride and phthalic anhydride are used. The resins typically are diluted with crosslinking monomers such as styrene, alpha methyl styrene, vinyl toluene, or dialkyl phthalate.

When unsaturated polyester resins crosslink they normally shrink. Low profile thermoplastic additives are incorporated to minimize the shrinking, which would otherwise lead to warpage and loss of dimensional tolerance in the molded part. A low profile thermoplastic additive particularly useable in the present invention is Neulon T Plus.

The filler generally is a fine ground mineral material. The preferred filler usable in the present invention is calcium carbonate. Other examples include clay and talc. Hydrated aluminum is commonly used in applications where flame retardance is important. When the filler is added to the resin, the resultant mixture has a dough-like consistency, which can then be molded. The filler improves the appearance and overall structure of the final product. As stated above, since filler is much cheaper than resin, it is desirable to use as high a proportion of filler as possible, while still having a sufficient amount of resin to disperse throughout the molding compound.

A reinforcement material also is added to increase the strength of the final product. The preferred reinforcement material is fiberglass. In a BMC process, the fiberglass is chopped and added to the resin with the other components. In a SMC process, the resin and other components are mixed-and formed into a thin sheet. See, e.g., U.S. Pat. No. 5,445,877 referenced above. Other possible reinforcement materials are cotton flock, cellulose flock, and wood flower.

The mold release agents of the present invention are selected from the group consisting of tertiary alkyl primary amine carboxylates having the general structure:

or

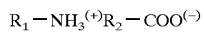

where $R_1$ is a linear or branched tertiary alkyl group in the $C_{12}$–$C_{22}$ range, and $R_2$ is a linear or branched, saturated or unsaturated, alkyl group in the $C_8$–$C_{24}$ range. To the inventors' knowledge, tertiary alkyl primary amine carboxylates have never been used as mold release agents, particularly in BMC and SMC processes.

The mold release agent is formed by mixing the following two ingredients: (1) a tertiary alkyl primary amine of general structure:

and (2) an aliphatic carboxylic acid of general structure:

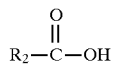

where $R_1$ and $R_2$ are as described above. The main advantages of the present invention stem from the fact that the mold release agent is a liquid at room temperature. The two ingredients are simply reacted in a manner well known in the art in essentially stoichiometric amounts. The acid-base neutralization reaction is exothermic. Examples of the amine include various primene compounds such as those manufactured by Rohm & Haas. Isomeric mixtures of tertiary alky primary amines in the $C_{12}$ to $C_{14}$ are particularly suitable. Examples of the acid include tall oil and similar fatty acids, tallow fatty acid, oleic acid, stearic acid, and isostearic acid. Because they are liquids, the mold release agents of the present invention readily disperse in the liquid resin without forming lumps or significantly changing the resin's viscosity.

The following are examples of various mixtures for creating the liquid mold release agents of the present invention. Other mixtures are possible.

EXAMPLE 1

46.6 parts of isostearic acid was mixed with 53.4 parts of a mixture of isomeric tertiary alkyl primary amines in the $C_{16}$ to $C_{22}$ range. The reaction was exothermic. The product was 100.0 parts of a liquid tertiary alkyl primary amine carboxylate.

EXAMPLE 2

59.6 parts of tall oil fatty acid was mixed with 40.4 parts of a mixture of isomeric tertiary alkyl primary amines in the $C_{12}$ to $C_{14}$ range. The reaction was exothermic. The product was 100.0 parts of a liquid tertiary alkyl primary amine carboxylate.

EXAMPLE 3

58.4 parts of commercial stearic acid was mixed with 41.6 parts of isomeric tertiary alkyl primary amines in the $C_{12}$ to $C_{14}$ range. The mixture was heated to 180° F. The reaction was exothermic. The product was 100.0 parts of a liquid tertiary alkyl primary amine carboxylate.

EXAMPLE 4

58.9 parts of oleic acid was mixed with 41.1 parts of a mixture of isomeric tertiary alkyl primary amines in the $C_{12}$ to $C_{14}$ range. The reaction was exothermic. The product was 100.0 parts of a liquid tertiary alkyl primary amine carboxylate.

EXAMPLE 5

30.7 parts of 2 ethyl hexoic acid was mixed with 69.3 parts of a mixture of isomeric tertiary alkyl primary amines in the $C_{16}$ to $C_{22}$ range. The reaction was exothermic. The product was 100.0 parts of a liquid tertiary alkyl primary amine carboxylate.

Any one of the resultant liquid mold release agents can be incorporated with the other components to form an unsaturated polyester thermosetting molding compound. A catalyst is added to ensure the reactivity of the system. The catalysts used with the present invention primarily are peroxide catalysts such as benzoyl peroxide, tertiary butyl peroctoate, and tertiary butyl perbenzoate. Once the resin is dispersed with the other components, a thickener also is added to achieve molding viscosity. Common thickeners include MgO, $Mg(OH)_2$, or $Ca(OH)_2$. Optionally, a pigment can be added if a colored part is desired.

The system can be used to manufacture molded plastic components as follows. In a BMC process, the components described above are mixed in a single vessel to form the BMC. Alternatively, the resultant compound can be formed into a sheet as is known in the art to create a SMC. There are no special mixing requirements for the molding compounds and the liquid mold release agents of the present invention. The components are mixed at room temperature in a manner commonly known in the art.

The proportions of the various components are measured per 100 parts of resin. Per 100 parts of resin, the following chart represents the general and preferred ranges of parts of the other components in the system.

|  | Generally | Preferred |
| --- | --- | --- |
| Filler | 25–250 | 75–150 |
| Reinforcement | 25–150 | 75–125 |
| Catalyst | 0.5–5.0 | 1.0–2.0 |
| Thickener | 0.5–5.0 | 1.0–2.0 |
| Crosslinking Monomer | 5.0–25 | 10–15 |
| Low Profile Thermoplastic Additive | 10–200 | 25–75 |
| Liquid Mold Release Agent | 0.20–10 | 0.20–6.0 |

Preferably, the components constituting the small proportions of the molding compound, mainly the liquid mold release agent, catalyst, and monomer, are added to the resin first so they can be easily dispersed in the resin. Then the remaining components are added, with the reinforcement material and the thickening agent being added last.

The SMC or BMC is then placed in a mold in a manner known to those skilled in the art. The mold is heated for a time and at a temperature sufficient to cure the molding compound as also is well known in the art. After curing, the finished part is released from the mold and cooled.

The following examples illustrate the nature of the invention and the manner in which it is performed. The invention, however, should not be considered as being limited to the details of the examples.

BMC Test Results

The liquid mold release agents of Examples 1–5 were evaluated in the BMC Formulation shown in Table One. For comparison, formulations were also prepared using no mold release agent and using zinc stearate as the mold release agent.

TABLE ONE

BMC FORMULATION

|  | parts |
| --- | --- |
| Unsaturated Polyester Resin (arapol 26065) | 60 |
| Thermoplastic Additive (Neulon T Plus) | 40 |
| Crosslinking Monomer (Styrene) | 10 |
| Chopped Fiberglass (6 mm) | 75 |
| Filler (Calcium Carbonate) | 200 |
| Thickener (Magnesium Oxide 35% paste) | 1.5 |
| Catalyst (Tertiary Butyl Perbenzoate) | 1.5 |
| Mold Release Agent | 5.0 |

For each evaluation the resin, thermoplastic additive, styrene, catalyst and mold release agent were mixed at room temperature using a high shear mixer. BMC was then prepared by mixing the above with filler and magnesium oxide in a Z blade mixer for 5 minutes, adding the glass and mixing an additional 5 minutes. The BMC samples were kept in a nylon film and stored for one week at 20° C. before testing.

Samples were molded for 3 min. at 280° F. and 800 psi in a ¼"×12"×12" test mold and evaluated for release and appearance. Results are listed in Table 2.

TABLE 2

| Release Agent | Result | Appearance |
| --- | --- | --- |
| No Mold Release | stuck | poor |
| Zinc Stearate | released | good |
| Example 1 | released | excellent |
| Example 2 | released | excellent |
| Example 3 | released | excellent |
| Example 4 | released | excellent |
| Example 5 | released | excellent |

The samples were evaluated for release and for appearance of the finished molded article. As shown in the results, the mold release agents of the present invention had equal releasing performance to zinc stearate at the level tested. In addition, the surface characteristics of the molded article, as judged by visual inspection, was superior when the mold release agents of the present invention were used instead of zinc stearate. When the liquid mold release agents of the present invention were used, the molded article had no lumps, pittings, or imperfections at the surface. Although at 5.0 parts zinc stearate the surface characteristics of the molded article were adequate, some imperfections were present.

SMC Test Results

The liquid mold release agents of Examples 1 and 2 above were subsequently evaluated in the sheet molding compound listed in Table 3. Comparison was made again made to zinc stearate for release and appearance as before. The molded parts also were sent out for application of automotive primer, hot melt adhesive laminant, and vacuum deposited aluminum reflector coating adhesion tests.

TABLE 3

SMC FORMULATION

|  | parts |
| --- | --- |
| Unsaturated Polyester Resin (aropol 26065) | 50 |
| Lower Profile Additive (Nulon T Plus) | 40 |
| Cross Linking Monomer (Styrene) | 10 |
| Filler (Calcium Carbonate) | 150 |
| Thickener (Magnesium Oxide) | 1.0 |
| Catalyst (Tertiary Butyl Perbenzoate) | 1.0 |
| Mold Release Agent | (various levels) |
| Chopped Fiberglass Roaving | 50 |

Samples were prepared on a SMC machine and stored 1 week at ambient temperature before molding. Test moldings were evaluated for release after molding 3 minutes at 280° F./800 psi in a ¼"×12"×12" test box mold. Results of mold release tests and adhesion tests are given in Table 4. "Parts" is given as parts per hundred parts resin in the table.

TABLE 4

| Mold Release Agent | Parts | Release | Appearance | Adhesion Tests | | |
| --- | --- | --- | --- | --- | --- | --- |
| | | | | Primer | Adhesive | Vacuum Metal |
| zinc stearate | 5.0 | pass | good | fail | fail | fail |
| zinc stearate | 3.5 | pass | good | fail | fail | fail |
| zinc stearate | 2.0 | fail | poor | pass | pass | pass |
| Example 1 | 5.0 | pass | excellent | pass | pass | pass |
| Example 1 | 3.5 | pass | excellent | pass | pass | pass |
| Example 2 | 5.0 | pass | excellent | pass | pass | pass |
| Example 2 | 3.5 | pass | excellent | pass | pass | pass |
| Example 2 | 2.0 | pass | excellent | pass | pass | pass |

Similar to in the BMC tests, the liquid molds release agents of the present invention had equal release performance to zinc stearate at 3.5 and 5.0 parts, and better surface characteristics. Note, however, that at these levels zinc stearate failed the adhesion tests, i.e., the coatings did not sufficiently adhere to the surface of the molded component. Only when the level of zinc stearate was lowered to 2.0 parts did zinc stearate pass the adhesion tests. At this low level, however, zinc stearate failed both the release and appearance tests. (Inadequate release detrimentally affects appearance since the part sticks to the mold.) In contrast, the mold release agents of the present invention passed the release, appearance, and adhesion tests at all levels tested.

Thus, as shown in the test results, the use of the liquid mold release agents of the present invention provide numerous advantages over mold release agents currently used in unsaturated polyester thermosetting molding compounds. The present invention, therefore, is more successful in manufacturing intricate components to high tolerances. The superior mold release activity also permits a higher proportion of filler to be used as opposed to resin. In addition, unlike powder mold release agents, the liquid mold release agents of the present invention do not create lumps or other imperfections at the mold surface. Thus, products made according to the present invention are immediately suitable for the application of vapor deposited metals, adhesives, laminants, paints, and similar coatings. The mold release agents also do not significantly affect the resin viscosity, and thus do not interfere with the dispersion of the resin throughout the molding compound. This also permits a higher proportion of filler to be used. These advantages allow for a higher quality product at lower cost and production time than is presently attainable.

Alternatively, the liquid mold release agents of the present invention can be used in combination with zinc or calcium stearate, liquid zinc salts, phosphate esters, or other mold release agents currently in use to improve their performance.

The liquid mold release agents of the present invention also can be used in pultrusion and wet-mat molding processes, described above. In such processes, the molding compounds generally lack the low profile thermoplastic additive and the thickener.

Although the invention has been described with reference to exemplary and preferred embodiments, it is understood by those skilled in the art that variations can be made without departing from the spirit or scope of the invention, as described in the claims that follow.

We claim:

1. A molding compound comprising an unsaturated polyester resin, a filler, a reinforcement material, a crosslinking monomer, a catalyst, and a mold release agent, where said mold release agent is selected from the group consisting of tertiary alkyl primary amine carboxylates.

2. The molding compound according to claim 1 wherein the molding compound further comprises a thickener and a low profile thermoplastic additive.

3. The molding compound according to claim 2 wherein the molding compound further comprises a pigment.

4. The molding compound according to claim 1 wherein the tertiary alkyl primary amine carboxylates comprise a tertiary alkyl primary amine reacted with an aliphatic carboxylic acid, and said tertiary alkyl primary amine is in the $C_{12}$ to $C_{22}$ range.

5. The molding compound according to claim 1 wherein the tertiary alkyl primary amine carboxylates comprise a tertiary alkyl primary amine reacted with an aliphatic carboxylic acid, and said aliphatic carboxylic acid is a saturated or unsaturated linear or branched carboxylic acid in the $C_8$ to $C_{22}$ range.

6. The molding compound according to claim 1 wherein the tertiary alkyl primary amine carboxylates comprise a tertiary alkyl primary amine reacted with an aliphatic carboxylic acid, and said tertiary alkyl primary amine is an isomeric mixture of tertiary alkyl primary amines in the $C_{12}$ to $C_{14}$ range, and said aliphatic carboxylic acid is a fatty acid.

7. The molding compound according to claim 1 wherein the tertiary alkyl primary amine carboxylates comprise a tertiary alkyl primary amine reacted with an aliphatic carboxylic acid, and said tertiary alkyl primary amine is an isomeric mixture of tertiary alkyl primary amines in the $C_{12}$ to $C_{14}$ range, and said aliphatic carboxylic acid is selected from the group consisting of oleic acid, tall oil fatty acid, tallow fatty acid, stearic acid, and isostearic acid.

8. The molding compound according to claim 1 wherein the molding compound contains 0.20 to 10.0 parts mold release agent per 100 parts resin.

9. The molding compound according to claim 6 wherein the molding compound contains 0.20 to 6.0 parts mold release agent per 100 parts resin.

10. The molding compound according to claim 1 wherein the reinforcement material is chopped fiberglass.

* * * * *